United States Patent [19]

Decraemer et al.

[11] 4,351,002
[45] Sep. 21, 1982

[54] CIRCUIT FOR CORRECTING PHASE DEVIATIONS BETWEEN THE LINE DEFLECTION DRIVE SIGNALS AND THE LINE SYNCHRONIZING SIGNALS IN A TELEVISION RECEIVER

[75] Inventors: Alain Decraemer, Garches; Jean-Michel Pernot, Fontenay-aux-Roses, both of France

[73] Assignee: U.S. Philips Corporation, New York, N.Y.

[21] Appl. No.: 227,040

[22] Filed: Jan. 21, 1981

[30] Foreign Application Priority Data

Jan. 25, 1980 [FR] France ............................... 80 01643

[51] Int. Cl.³ .............................................. H04N 5/04
[52] U.S. Cl. ................................................ 358/158
[58] Field of Search ...................... 358/158, 159, 195.1

[56] References Cited

U.S. PATENT DOCUMENTS 3,821,470 6/1974 Merrell ............................... 358/159

Primary Examiner—Robert L. Richardson

Attorney, Agent, or Firm—Thomas A. Briody; William J. Streeter; Laurence A. Wright

[57] ABSTRACT

A substantially digital circuit for correcting phase deviation which comprises a phase comparison stage and a synchronizing control stage. The phase comparison stage includes a reference oscillator, a frequency divider connected to the output of the oscillator and whose output signals constitute the useful line deflection drive signals, as well as a phase comparator comprising a logic circuit and a counter. The logic circuit receives the output signals of the frequency divider and the line synchronizing signals and the counter, which is connected to the output of the oscillator produces a signal which is representative of the phase deviation detected in control stage, the latter comprising a state detector for detecting the synchronized state, in which the phase deviation detected is below a limit value or the unsynchronized state and a correction signal generator for controlling the division ratio of the frequency divider. This frequency divider comprises a counter, an adder, and a decoder the output signal of which is stabilized by means of a stabilizing stage.

7 Claims, 9 Drawing Figures

CIRCUIT FOR CORRECTING PHASE DEVIATIONS BETWEEN THE LINE DEFLECTION DRIVE SIGNALS AND THE LINE SYNCHRONIZING SIGNALS IN A TELEVISION RECEIVER

The present invention relates to a circuit for correcting phase deviations between the line deflection drive signals and the line synchronising signals in a television receiver.

BACKGROUND OF THE INVENTION

In spite of the quality obtained with the present-day receivers, their complexity and the obvious fact that their construction is the result of a compromise between the quality of the images produced, the technical manufacturing possibilities of the principal components and above all the cost price leave no doubt that a vast range of improvements or simplifications is possible. On the other hand the difficulty involved in the analogue processing of information and the sensitivity to all kinds of errors, deviations or distortions are an incentive to use this information preferably in digital form, with the aid of analog-to-digital converters. However, in the present state of development such converters are either too slow for use for the above-mentioned application, or have a comparatively high consumption and are of a complexness which makes them expensive.

SUMMARY OF THE INVENTION

The invention has for its object to provide for the realisation of the above-mentioned correction circuit a solution in accordance with which the circuit is implemented in an almost completely digital form and does not comprise any analog-to-digital converter, the circuit being characterized in that it comprises:

a digital phase comparison stage including a reference oscillator producing periodic pulses for a frequency which is higher than the line frequency, a frequency divider provided at the output of said oscillator for a producing line deflection drive signals and a phase comparator which receives at a first input the output signals of the frequency divider and at a second input the line synchronising signals received by the receiver and which produces from the phase deviation detected between said received signals a digital signal, the value and the sign of which are related to the value and the sign of the phase deviation, and a digital synchronising control stage to which the output signal of the phase comparator is applied and which includes a synchronisation or desynchronisation state detector for detecting the synchronised state, in which the phase deviation detected is lower than a predetermined limit value, or the unsynchronised state, in which the phase deviation detected is higher than the said limit value, and a correction signal generator for adjusting the division ratio of the frequency divider either to maintain the synchronised state of the receiver when the detector has detected the existence of this state, or to try to obtain this state when the detector has detected the opposite state, the unsynchronised state, of the receiver.

BRIEF DESCRIPTION OF THE DRAWINGS

The invention and its advantages will be more readily understood with reference to the following description and the accompanying drawings which show by way of non-limitative example an embodiment of the invention and wherein:

FIG. 6 shows the curve of the phase deviation $\phi$ as a function of the number n of lines during the search of synchronisation;

DETAILED DESCRIPTION OF THE PREFERRED EMBODIMENTS

Figure 1:
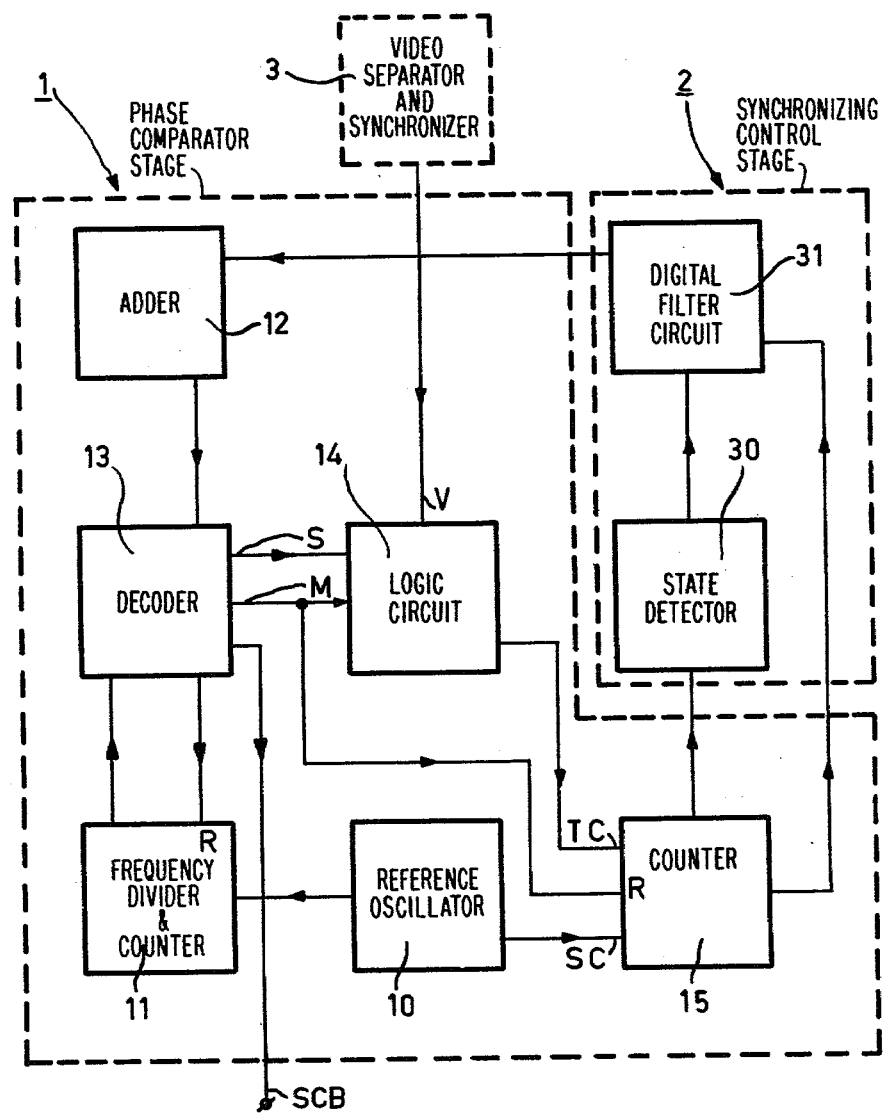
FIG. 1 is a circuit diagram of the correction circuit according to the invention.

The circuit according to the invention (FIG. 1) comprises two fundamental digital stages, namely a phase comparison stage 1 and a synchronising control stage 2.

The phase comparison stage 1 comprises: (a) a reference oscillator 10, which produces periodic pulses having a frequency which is higher than the line frequency of the television receiver (in the example described here the frequency of the oscillator is 40 MHz, the pulse repetition period being thus 25 nanoseconds, but these values have as a matter of fact been chosen in accordance with the quantisation step desired and which is the finer according as the frequency of the oscillator is higher); (b) a frequency divider having a counter 11, an adder 12 and a detector 13 and producing line deflection drive signals; (c) a phase comparator which will be described in greater detail hereinafter, which receives at a first input the output signals of the frequency divider and at a second input the line synchronising signals supplied by a video signal separating and synchronising stage 3 (which is part of the receiver) and which supplies on the basis of a phase deviation detected between these received signals a digital signal the value and the sign of which are directly related to the value and the sign of the deviation, as will be explained hereinafter.

The counter 11 of the frequency divider is connected to the output of the reference oscillator 10 and comprises 12 output bits. The adder 12 in which a fixed value N of the frequency division ratio and an algebraic correction value dN, which is produced as will be shown herebelow, by the synchronising control stage 2 are added together also comprises 12 output bits. The decoder 13 receives the 12-bit digital output signals of the counter 11 and also the 12-bit digital output signal N+dN from the output of the adder 12 and produces by means of 12 exclusive OR circuits which connect the corresponding bits of the counter and the adder in a two-by-two relationship, and a decoding circuit produces an output pulse S (which has a duration of 25 nanoseconds) when and only when all the corresponding bits coincide. In the absence of this coincidence there is no signal at the output of the decoder 13; when on the other hand coincidence between the two received digital signals is detected by the decoder the pulse which appears at its output causes the counter 11 to be reset to zero and is simultaneously applied to the first input of the phase comparator.

Figure 2:
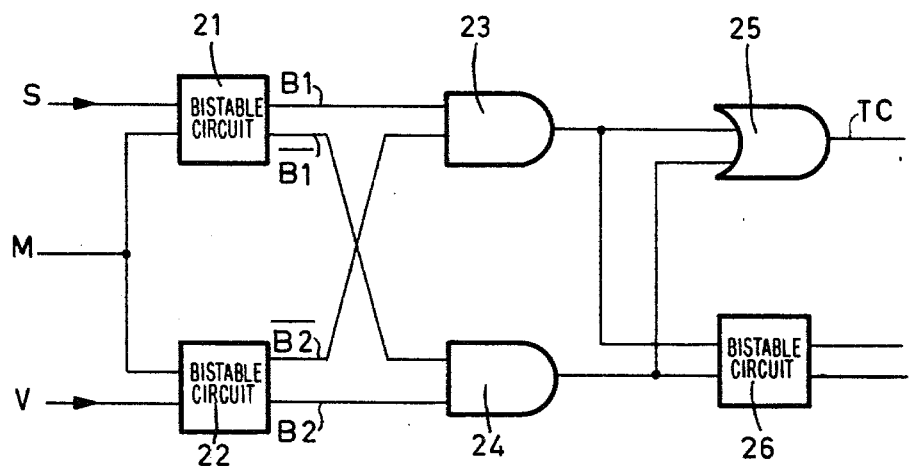
FIG. 2 shows the logic circuit of the phase comparator of the phase comparison stage.

This phase comparator comprises a logic circuit 14 and a counter 15; at its first input the logic circuit 14 receives the pulse S which has a duration of 25 nanoseconds supplied by the decoder 13 of the frequency divider and, at a second input, receives the line synchronising pulse V which is supplied by the separation stage 3, the duration of this pulse being approximately 5 microseconds. FIG. 2 shows that the pulse 5 is applied to a first input of a bistable circuit 21 and the pulse V to a first input of a bistable circuit 22, a line centre pulse M which is produced approximately 32 μs after pulse S being applied to the second input of these bistable circuits. When the two possible output signals of the bistable circuit 21 are denoted $B_1$ and $\bar{B}_1$ and the two possible output signals of the bistable circuit 22 are denoted $B_2$ and $\bar{B}_2$, respectively, the two output leads from $B_1$ and $\bar{B}_2$ are connected to the two inputs of an AND-gate 23, while the two output leads from $B_2$ and $\bar{B}_1$ are connected to two inputs of a further AND-gate 24. The output lead of AND-gate 23 and that of the AND-gate 24 are connected to the two inputs of an OR-gate 25, respectively, the output of this OR-gate producing a pulse which has a duration which is equal to the time corresponding to the phase deviation between the pulse S and the pulse V.

Figure 3:
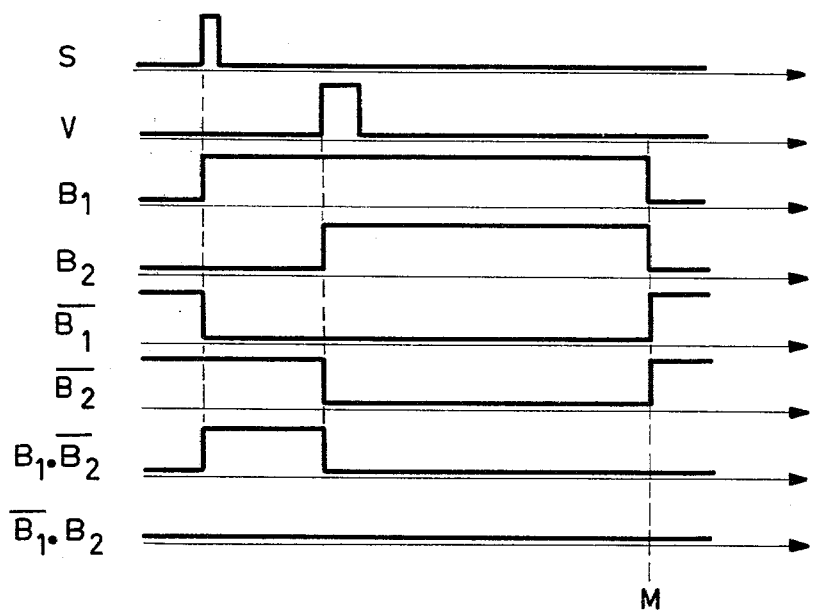
FIG. 3 illustrates the different signals present at the princpal points of the logic circuit of FIG. 2.

Taking the structure of the logic circuit 14 which has been described above (and which is illustrated in FIG. 2 while FIG. 3 shows the signals present at different points of this logic circuit) into account, the output signal of the OR-gate 25 is given by the expression:

$$TC = B_1 \cdot \bar{B}_2 + \bar{B}_1 \cdot B_2$$

When, for example, the pulse V arives after pulse S the phase deviations TC is given by $B_1 \cdot \bar{B}_2$ as, as shown in FIG. 3, $\bar{B}_1 \cdot B_2$ is zero. Inversely, when the pulse S arrives after pulse V, $B_1 \cdot \bar{B}_2$ is zero and $\bar{B}_1 \cdot B_2$ furnishes the phase deviation between the two pulses. A third bistable circuit 26, the two inputs of which receive the respective output signals of the AND-gates 23 and 24, furnishes the sign of this phase deviation, in accordance with that one of the two output leads of this bistable circuit at which a signal unequal to zero is present.

The counter 15 is associated with the logic circuit 14. Counter 15 is a 6-bit counter here, and receives signal TC which indicates the phase deviation between pulses S and V. Counter 15 also receives a continuous sequence of periodic pulses SC having a frequency of 40 MHz which are produced by the reference oscillator 10. Counter 15 further receives for each line centre, the reset-to-zero signal M produced by the decoder 13. In decoder 13 a fixed decoding operation is effected approximately 32 microseconds after each time counter 11 has been reset to zero by output pulse S of the decoder (the correction period of the digital filter circuit which will be described hereinafter, which correction period is shorter than that corresponding with a half line, which in fact makes it possible to determine the instant from which the reset-to-zero operation of counter 15 may be performed). Counter 15 produces a 6-bit digital output signal which represents the number of pulses of a duration of 25 nanoseconds which successively occur during the counting period corresponding to the phase deviation TC supplied by logic circuit 14. As bistable circuit 26 of this circuit 14 furnishes an information about the sign of the phase deviation (S after V or V after S) one has actually a 7-bit signal (6-bits+1 sign bit) at one's disposal. When the output signal of bistable triggering circuit 26 is "0", the absolute value of the signal of counter 15 is transmitted directly. When this output signal is a "1", the two's-complement of this absolute value is intended to be sent to the synchronising control stage 2, which will now be described in detail.

Figure 4:
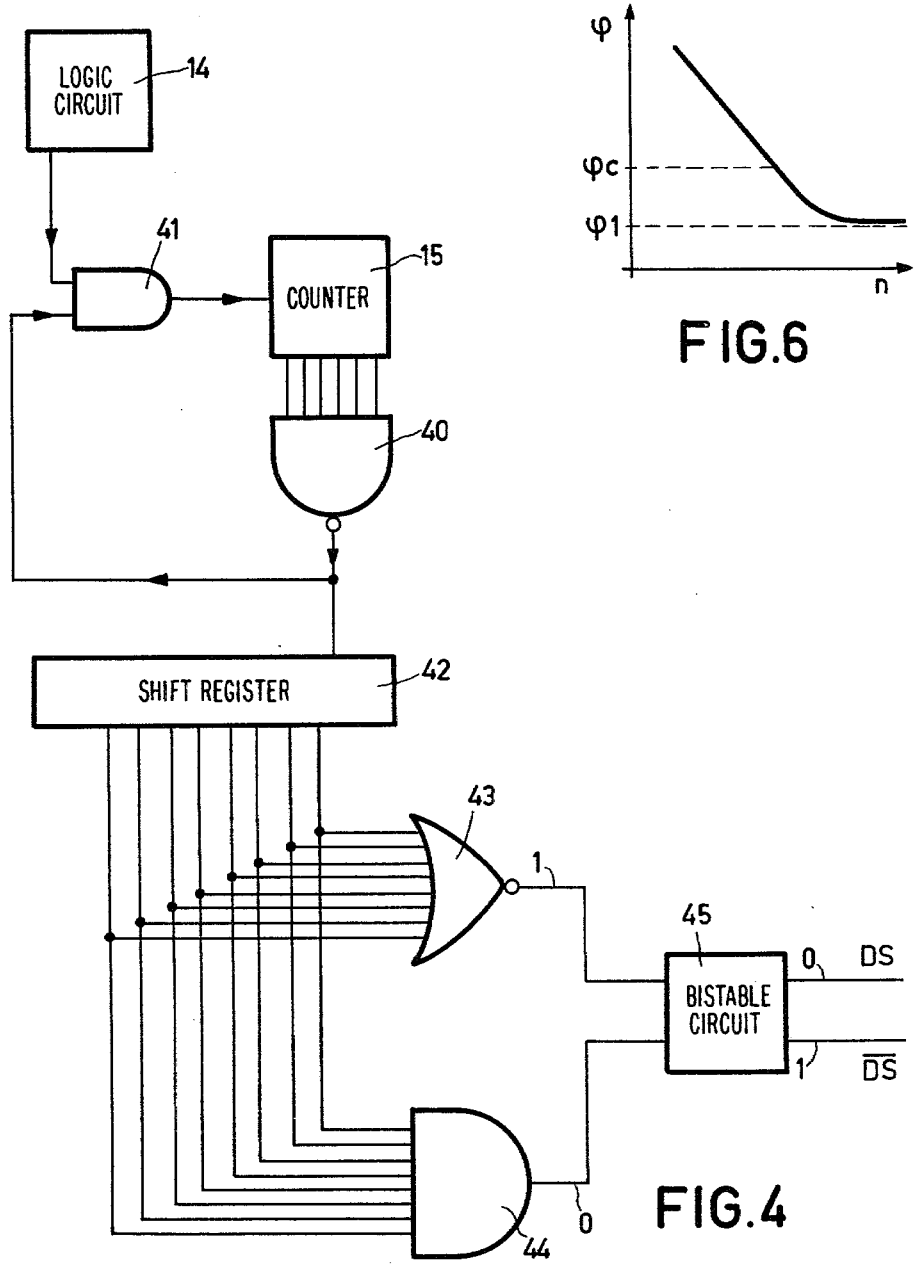
FIG. 4 and FIG. 5 show the state detector of the synchronising control stage and the correction signal generator of this stage, respectively.
Figure 5:
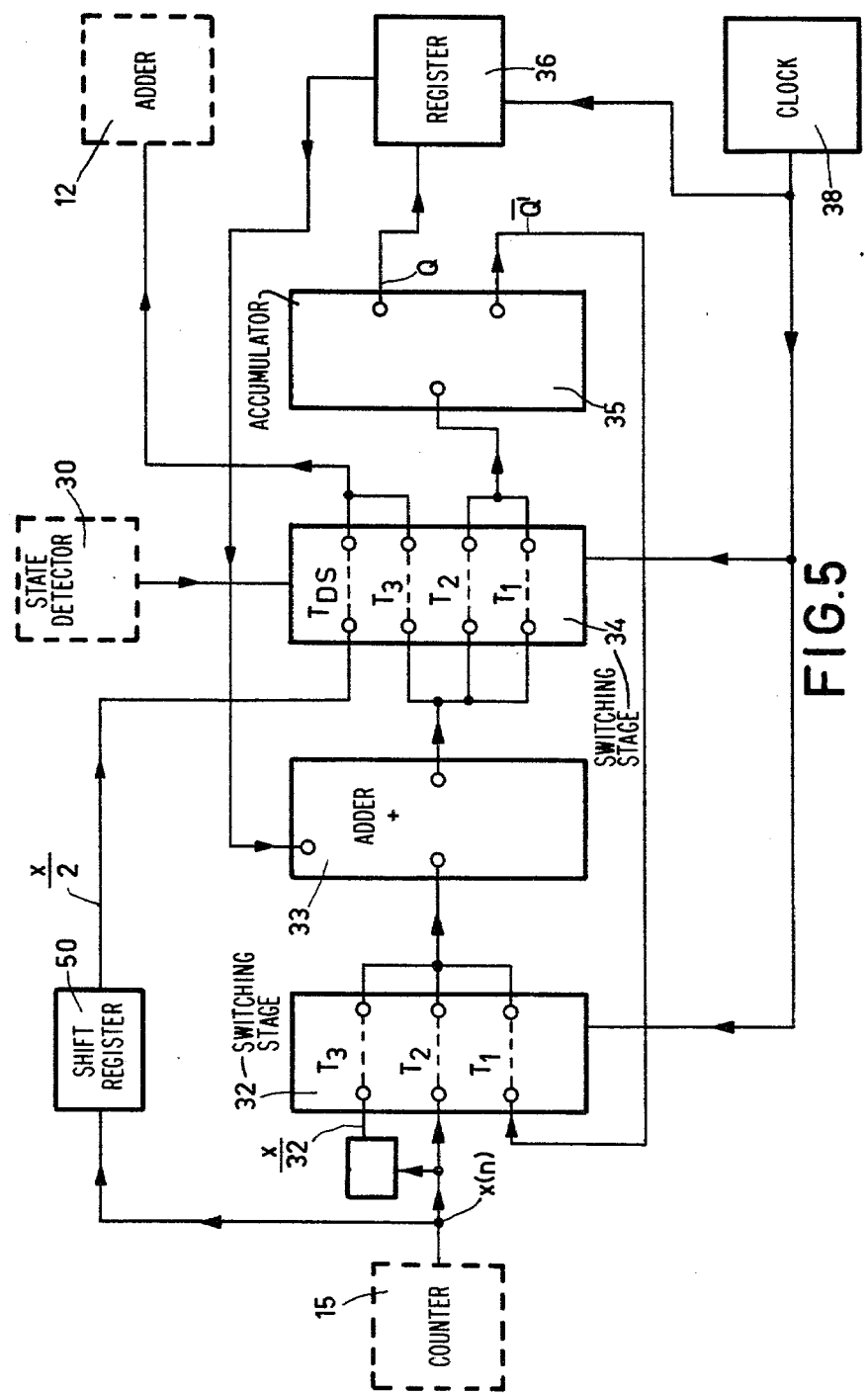

Stage 2 receives the above-described 7-bit digital signal which is supplied by phase comparator stage 1 comprises a state detector 30 and a correction signal generator which is here a digital filter circuit 31 (FIGS. 4 and 5 show an embodiment of the detector 30 and the circuit 31, respectively). As a matter of fact as long as the phase deviation detected in phase comparator stage 1 remains within a predetermined limit, it is said that there is synchronisation; when the phase deviation exceeds this limit value there is no synchronisation. In the embodiment described here the boundary between synchronisation and no synchronisation is determined by the maximum capacity of counter 15 of stage 1, and state detector 30 has for its function, as will be further explained herebelow, to detect that this limit has not been exceeded, or whether it has been exceeded permanently or not.

State detector 30 comprises a NAND-gate 40 which receives at its inputs the 6 bits which constitute the value of the digital output signal of the counter 15. If there is no synchronisation, that is to say if the maximum capacity of the counter 15 has been reached, these 6 bits have the value "1" and the NAND-gate 40 then and only then, produces a "0". The output lead of the NAND-gate 40 is connected to an input of a AND-gate 41. Another input of AND-gate 41 is connected to the output lead TC of the logic circuit 14 and the output of AND-gate 41 is connected to the input of the counter 15. By means of gate 41 it is possible to maintain the saturation state of counter 15. The output of the NAND-gate 40 is also connected to a shift register 42 having a series input and parallel outputs by means of which the situation detected at the output of the NAND-gate 40 (and consequently of counter 15) for 8 consecutive lines is recorded; 8 lines are only chosen by way of example, a higher number may be taken when a better immunity from disturbances in wanted. The 8 output bits of this register 42 are applied to the 8 inputs of a NOR-gate 43 and also to the 8 inputs of an AND-gate 44, which may to the same effect be replaced by a NAND-gate and an inverter, and the outputs of these gates 43 and 44 form the two inputs of a bistable circuit 45.

When the capacity of the counter 15 is exceeded for 8 consecutive lines, eight "0" are detected, after recording, at the output of the register 42. With eight "0" at the input of the NOR-gate 43 there corresponds, and only in this case, a "1" at the output of this gate. With eight "0" at the input of the AND-gate 44 there corresponds a "0" at the output. In this situation, the bistable circuit 45 which, at its first input, receives the output "1" from the NOR-gate 43 and at its second input the output "0" from the AND-gate 44, produces a "0" at its first output DS and a "1" at its second output $\overline{DS}$. It is then said that the "non-synchronised state" of the receiver has been obtained.

If the capacity of the counter 15 is exceeded for only some lines, or intermittently and never for more than at least eight consecutive lines, a "0" at the output of the NOR-gate 43 corresponds with the 8-bit output of the register 42 (composed of a certain number of "0" and "1", the "0" corresponding with the line for which the capacity of counter 15 is exceeded and the "1" with the lines for which the capacity of this counter is not exceeded). Then the outputs of the bistable circuit 45 become DS=1 and $\overline{DS}$=0; the "synchronised state" of the receiver has been obtained. In this synchronised state the bistable circuit 45 does not change state when the capacity of the counter 15 is erratically exceeded. A change in state only occurs when the outputs of the NOR-gate 43 and the AND-gate 44 change simultaneously.

According as the state detector 30 has detected the synchronised state or the non-synchronised state, two different functions are then ensured by the digital filter circuit 31. In the synchronised state this filter circuit 31 is equivalent to the low-pass filter which is used in the customary manner in prior art analogue implementations and which, having been designed so that it is only sensitive to slow variations in order to act as a flywheel, is an integrating circuit. When x(n) is the 6-bit digital signal present at the output of the counter 15 for the line of the order n, and y(n) is the output signal of the filter circuit 31 for the same line of the order n (when the synchronised state has been detected) y(n) is supplied by the following expression:

$$y(n)=a\,x(n)+b\,y(n-1)$$

wherein a and b are coefficients which have been calculated in order that the filter is indeed the desired low-pass filter (the choice for a and b is determined by the desired filter characteristic and the slope of the characteristic). In the present case the following values are used:

a=1/2048 and b=2047/2048 (these values having been chosen while taking the power of 2 which is nearest to the appropriate values into account, for simplicity of the calculations). Consequently:

$$y(n)=x(n)/2048+2047\,y(n-1)/2048$$

or:

$$2048\,y(n)=x(n)+2047\,y(n-1)$$

As x(n) and y(n) are digital signals and 2048 is a power of 2, it is sufficient, to obtain y(n) starting from 2048 y(n), to effect 11 shifts to the right (2048=$2^{11}$) of the digital value of 2048 y(n). For this determination of y(n) the calculation is done in three steps:

(a) to obtain 2047 y(n−1), y(n−1) should be subtracted from 2048 y(n−1), which has been determined by the preceding cycle of the calculation. It is preferred to add to 2048 y(n−1) its two's complement, which furnishes the same result.

(b) x(n) is added to 2047 y(n−1).

(c) the digital value of 2y(n) is obtained by means of ten shifts of 2048 y(n) to the right (instead of effecting 11 shifts to the right as described above, preference is given to 10 shifts only in actual practice: thus 2y(n) is obtained instead of y(n), which is equivalent to an increase in the statical gain and makes a stronger phase correction with a more faithful restitution possible). At the same time a fraction of x(n) is added to this calculated value 2y(n) (in this case x(n)/32), which fraction has for its purpose to simulate a resistance in series with the capacitor of the analogue low-pass filter to which the digital filtering circuit realised by means of the stages (a) and (b) is equivalent. This capacitor of the analogue filter is here simulated by the not insignificant inertia of the filter circuit 31, which can be seen from the fact that y(n) and y(n−1) differ only little from each other. As this capacitor short circuits the signal completely above a certain frequency, no correction whatsoever would be possible anymore as no error signal would be available anymore. Adding a fraction of x(n) to the value of y(n) is therefore the same, in the equivalent analog filter, as the provision of a voltage divider which is superimposed on the filter circuits and which makes it possible to send a small residual voltage which is sufficient to bring about the correction. At the same time this stabilizes the filter circuit by damping it, by smoothing the overshoot produced by the presence of the filter, which manifests itself in the absence of this simulated resistance. The signal finally obtained after the steps (a), (b) and (c) have been performed is then applied to the adder 12 (see FIG. 1). This is the signal denoted dN in the foregoing.

On the contrary, when the receiver is in the non-synchronised state, the deviation x(n) is divided by two before any filtering action, in order to bring this deviation x(n) to a value which is compatible with the capacity of the counter 15. This divide-by-two action is realised by means of a shift register 50, which supplies a signal y(n)=x(n)/2 which, as before, is applied to the adder 12. When y(n) is not compatible with the capacity of the counter 15, the divide-by-two operation is repeated as many times as necessary for the digital value y(n) obtained to become lower than the capacity of the counter. When this result has been obtained and when furthermore the value of y(n) remains within the limit of the capacity of the counter 15 during at least the scanning of eight consecutive lines it is assumed that the synchronised state has been obtained again; the filter circuit is then switched to the synchronised position, this circuit having been preset at the moment of changeover to a value which is approximately equal to the value taken for the signal dN after eight consecutive lines in the synchronised state (to eliminate transient phenomena due to the overshoots occurring with analogue filters). The filter circuit 31, the structure and operation of which will now be described in greater detail, may now again perform the function of a low-pass filter as described above.

The embodiment chosen here for the filter circuit 31 (FIG. 5) comprises a switching stage 32, an adder 33, a switching stage 34, an accummulator 35, a register 36, a clock circuit 38 and the shift register 50. The adder 12, the counter 15 and the state detector 30, which have already been described are shown by means of broken lines. According as the receiver is in the synchronised state or in the opposite state, the non-synchronised state, the state detector 30 permits only the performance of the three steps (a), (b), (c) during three time intervals $T_1$, $T_2$, $T_3$ or, in the opposite case, only the performance of the divide-by-two dividing operation (for the return of y(n) to within the limits of the capacity of the counter 15) during the time interval $T_{DS}$ (the connections in FIG. 5 with the references $T_1$, $T_2$, $T_3$ or $T_{DS}$ are only made during the said time intervals, all the other connections being permanent).

In the synchronised state the sequence of the steps (a), (b), (c) is controlled as follows:

(a) 2048 y(n−1), which is the digital value Q present at the output of the accumulator 35 at the end of the preceding cycle of operation of the steps (a), (b), (c), is applied to the adder 33, while the two's-complement of 2048 y(n−1) (that is to say $\overline{Q}'$), a value which is also derived from the output of the accumulator 35 is simultaneously applied to an input of the switch 32 which, under control of the clock circuit 38, also applies it to the adder 33. These operations are performed during the time interval $T_1$, at the end of which the value 2047 $y(n-1)$, which appeared at the output of the adder 33 and which passes through the switch circuit 34 is stored in the accumulator 35.

(b) $x(n)$, being the digital value supplied by the counter 15, is applied to the switch circuit 32 which, under the control of the clock circuit 38, applies it immediately to the adder 33. These operations are performed during $T_2$ at the end of which the value 2048 $y(n)=x(n)+2047\ y(n-1)$ which appeared at the output of the adder 33 is stored in the accumulator 35 after having passed through the switch circuit 34.

(c) 2048 $y(n)$, being the digital value present at the output of the accumulator 35 at the end of interval $T_2$ is applied to the register 36 where, after having been shifted ten times to the right, the digital value $2y(n)$ is obtained to which the fraction $x(n)/32$ is added by means of the adder 33. The value thus obtained passes through the switch circuit 34 under the control of the clock circuit 38 during time interval $T_3$ which produces the final output signal which is applied to the adder 12 to form the signal $dN$.

In the non-synchronized state the connections $T_1$, $T_2$, $T_3$ in the switch circuit 34 are no longer established, but only the connection $T_{DS}$ from the output DS of the bistable circuit 45 of the state detector 30 being made to perform from $x(n)$ onwards the divide-by-two operations (in shift register 50) which make it possible to return the output signal of the circuit 31 within the capacity of the counter 15 and to resynchronise the receiver.

So the synchronising control state 2 which is formed by the connection of the state detector 30 to the digital filter circuit 31 (including the shift register 50 which can however, never operate if the non-synchronised state is never detected) has been provided to ensure constant look in ranges which are satisfactorily defined (by the capacity of counter 15). When a frequency correction must be effected in addition to the phase correction necessitated by the detection of a phase deviation, the curve $\phi=f$ (number of lines n), which expresses for each line the value of the phase deviation according as the search for synchronisation progresses, does asymptotically no longer tend to the horizontal axis of the abscissa $\phi=0$, but towards an asymptote $\phi_1=$ deviation of the period detected, parallel to the horizontal axis. This same curve shows that this deviations of the period can never be reduced when it is above the capacity $\phi_c$ of the counter 15; when it is below this capacity it can always be reduced.

The output signal $dN$ of the filter circuit 31 is applied to the adder 12, which also receives a signal N displayed in binary form at appropriate inputs and which is equal to the ratio between the frequency of the reference oscillator 10 and the line frequency of the receiver (in the present case N is equal to 40 MHz/15,625 MHz, i.e. 2560). When $dN=0$, this means that the line deflection drive signals resulting from the frequency division performed on the periodic output pulses of the oscillator 10 and the line synchronising signals supplied by the video and synchronising signal separating stage 3 included in the receiver, have accurately the same phase. On the contrary, when dN is positive or negative this is an indication that these signals do not have the same phase and that a correction of the value N must be effected to compensate for the drifts which produce this phase deviation. At the output of decoder 13, the signal which is ultimately obtained is formed by pulses having a variable period equal to T $(N\pm dN)$, T being the period of the clock circuit formed by the reference oscillator 10, these pulses constituting the useful line deflection drive signals which are produced by the circuit of the invention and are available at the output lead SCB (see FIG. 1) of the decoder 13. The duty cycle of these signals depends on the driver stage to which they are applied (and which do not form part of the invention): when the drive element in this stage is a transistor, the duty cycle may be near 50% to ensure that the signals are of a sufficient duration, whereas it may be lower for the case in which the driven element is a thyristor.

It should be noted, however, that in the correction circuit of the invention the value to be digitally quantized need not of necessity be an exact multiple of the quantizing step defined by the frequency of oscillator 10. This value is then expressed as an approximated value, either below or above the actual value, and a continuous variation of the number of quantizing steps between these two approximated values is produced (immediately below or above the real value to be quantized), which results in an instability in the start of the line deflection and, consequently, in a loss of alignment with respect to the video signal, which shows particularly in vertical lines.

This instability may be completely suppressed by means of the stabilising stage described with reference to FIGS. 7 and 8 and which is arranged between the output of the decoder 13 and the lead SCB. Starting from the useful deflection drive signal, a square-wave signal is generated in known manner at the output SD of the decoder 13 which represents a certain number of clock pulses (the output pulses of oscillator 10) and which are consequently of a constant width (see FIG. 8a), but the edges of which are affected by the jitter due to the random framing below or above the real value to be quantized; the result is that, contrary to the width of the square wave signal, the remaining portion of the period is not fixed either but is effected by the same jitter. These square-wave signals are applied from the decoder 13 to an integrator 60, which produces the signal shown in FIG. 8b. Because of the linearity of the sawtooth configuration of this signal the ascending edges are all in parallel with respect to one another, which also applies to the descending edges, and in addition they are affected with the same jitter as mentioned above. Moreover, as the square-wave signals which correspond to these ascending edges have constant values the quadrilaterals ABCD are parallelogrammes and the segments BC and DA are equal and aligned with the corresponding descending edges. Therefore, whatever the instability which affects the useful line deflection drive signals, one can see in FIG. 8b that the large majority of all the descending edges of the output signal of the integrator 60 are superimposed on each other, the instability only affecting the ascending edges of this signal and the ends of the descending edges.

It is therefore sufficient to use trigger thresholds for these descending edges which are superimposed and apparently fixed to produce square-wave signals which are absolutely stable. This operation is realized by means of two comparators 61 and 62, which are arranged in parallel and receive each the sawtooth shaped output signal, from the integrator 60. The comparator 61, for example, receives this signal at its non-inverting input, whereas the comparator 62 receives it at its inverting input. The output signals of the comparators 61 and 62 (shown in FIGS. 8c and 8d, respectively) are applied to two input of a NAND-gate 63, a third input of this NAND-gate 63 receiving (see FIG. 8e) the output signal from the decoder 13 after it has been passed through an inverter 64. The output signals of the NAND-gate 63 (see FIG. 8f) form the useful line deflection drive signals, this time absolutely stable, which are available on the lead SCB of FIGS. 1 and 7. As shown by FIG. 8f in relation with FIG. 8b, it is sufficient to shift the trigger threshold on the descending edges (FIG. 8b) by means of the voltages at the other input of the comparators 61 and 62 to cause the width (FIG. 8f) of the useful line deflection drive signals and consequently the duty cycle to vary.

Figure 7:
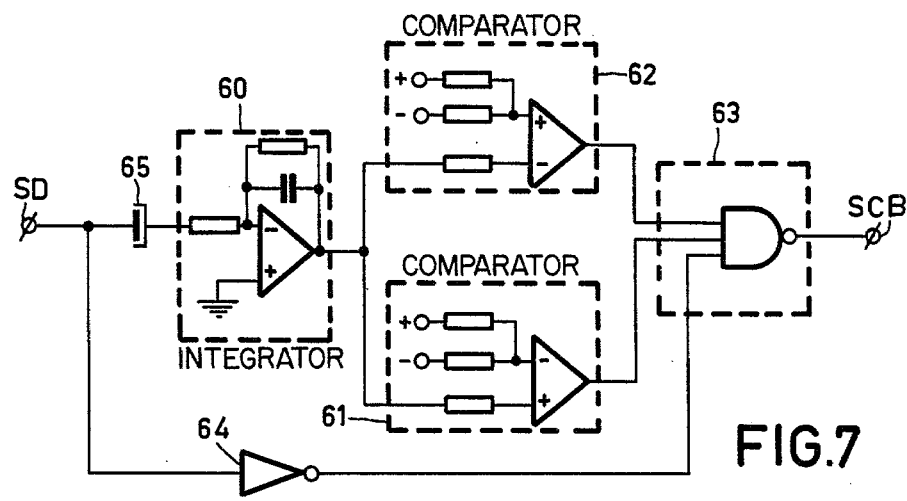
FIG. 7 shows an example of a stabilisation stage for the useful signals obtained and FIG. 8 shows different signals present at the principal points of this stage.
Figure 8:
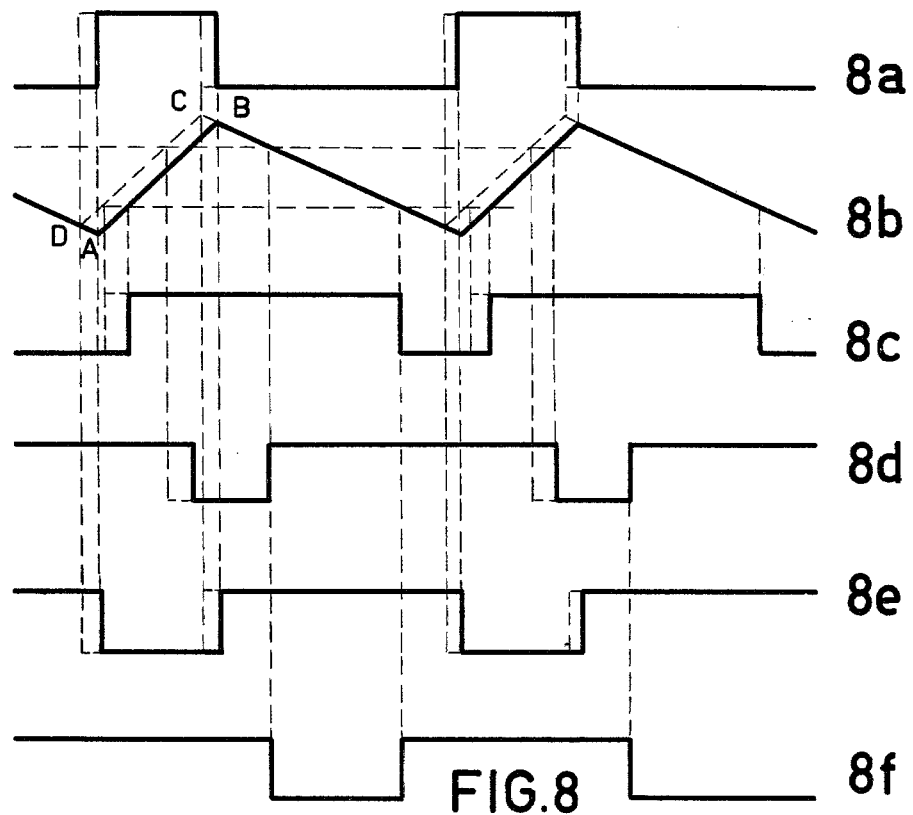

In the construction of FIG. 7 it is possible to give the sawtooth output signal of the integrator 60 an average value of zero by means of a capacitor 65. In contrast therewith, it may be interesting in a variant of the embodiment to be able to control this average signal continuously. This feature furnishes the following advantage: when the trigger thresholds remain fixed and if the average value of the sawtooth signal varies, a phase shift of the deflection drive signals which are available on the connection SCB is brought about.

Figure 9:
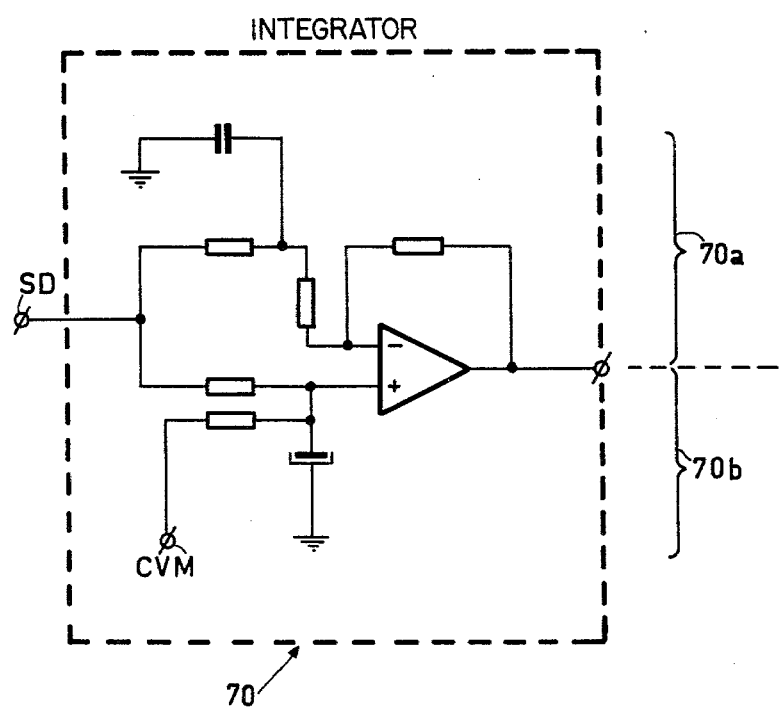
FIG. 9 shows a variant of a portion of FIG. 7.

FIG. 9 shows an embodiment of a circuit by means of which such a control of the phase position is possible (which alternative construction replaces the assembly formed in FIG. 7 by the integrator 60 and the capacitor 65). This circuit is a dual integrator 70 of the output signal of the decoder 13, whose upper portion 70a ensures, as in the foregoing, the production of the sawtooth signal (weak integration) and whose lower portion 70b ensures the production of a direct-current signal (strong integration) which will be superimposed on the sawtooth signal at the output of this integrator 70. The shift of the level of the d.c. signal is controlled by a signal which is delivered on the lead CVM and which has a duration which corresponds to, for example, the deviation $\Delta\phi$ between the line flyback pulse from the final line stage (not shown) and a fixed phase reference with respect to the oscillator, for example reset-to-zero pulses. The phase position of the useful deflection drive signals delivered on the lead SCB varies therefore as a function of the value of this deviation. Moreover, it should be noted that the variant shown in FIG. 9 has fewer outputs than the equivalent portion (integrator 60+capacitor 65) of the stage shown in FIG. 7, which is very advantageous for an implementation in integrated circuit technology.

It should be clearly understood that the present invention is not limited to the examples described in the foregoing and shown in the drawings, on the basis of which other implementations and embodiments are possible without passing beyond the scope of the invention. If is, for example, possible to give the sawtooth signal of FIG. 8b such a shape that the ascending edge AB would be distinctly longer and the descending edge distinctly shorter. As the descending edges then become less steep, each deviation from the linearity at the trigger threshold will result in a weaker parasitic phase variation of the signal of FIG. 8f.

It is alternatively possible to use one sole trigger threshold (and consequently one sole comparator 61 or 62) instead of two, as was the case for FIG. 8b, this sole threshold corresponding to the ascending edge of the signal of FIG. 8f when this ascending edge acts on the driven element (transistor or thyristor) of the deflection drive stage or corresponding, in the opposite case, to the descending edge. In these two cases the position of the edge which does not correspond to the sole threshold may be determined by means of counting (and taking the considerations mentioned in the foregoing on the subject of the duty cycle into consideration). The use of one sole threshold offers here the advantage of a larger freedom where to arrange it on the descending edge, between the end B of a sawtooth and the base D of the following sawtooth.

What is claimed is:

1. A circuit for corresponding phase deviations between the line deflection drive signals and the line synchronising signals in a television receiver, comprising:
    a digital phase comparison stage including a reference oscillator producing periodic pulses of a frequency which is higher than the line frequency, a frequency divider provided at the output of said oscillator for producing line deflection drive signals and a phase comparator which receives at a first input the output signals of the frequency divider and at a second input the line synchronising signals received by the receiver and which produces from the phase deviation detected between said received signals from a digital signal, the value and the sign of which are related to the value and the sign of the phase deviation; and
    a digital synchronising control stage to which the output signal of the phase comparator is applied and which includes a synchronisation or desynchronisation state detector for detecting the synchronized state in which the phase deviation detected is lower than a predetermined limit value, or the unsynchronised state, in which the phase deviation detected is higher than the said limit value, and a correction signal generator for adjusting the division ratio of the frequency divider either to maintain the synchronised state of the receiver when the detector has detected the existence of this state, or to try to obtain this state when the detector has detected the opposite state, the unsynchronised state, of the receiver.

2. A circuit as claimed in claim 1, wherein said frequency divider comprises a counter which is connected to the output of the reference oscillator, an adder for adding a fixed value of the division ratio and an algebraic correction value produced in the digital synchronisation control stage, and a decoder which receives the digital output signal of the counter and also the digital output signal of the adder and which supplies a signal only when these digital signals are equal, the sequence of output signals of the decoder thus obtained constituting the line deflection drive signals.

3. A circuit as claimed in claim 1, wherein said phase comparator comprises a logic circuit formed by two bistable circuits, which receive at a first input the output signals of the frequency divider and the line synchronising signals, respectively, and at a second input a reset-to-zero pulse, a first and a second gate to which the output signals of both bistable circuits are applied, a third gate to which the output signals of the first and second gates are applied, a signal having a duration equal to the value of the deviation detected between the output signals of the frequency divider and the line synchronising signals being obtained by means of said two bistable circuits and said three gates, said phase comparator further comprising a third bistable circuit to which the output signals of the first and second gates are also applied, for obtaining the sign of this phase deviation, and a second counter receiving at a first input the signal representative of the value of the phase deviation detected at a second input the output pulses of the reference oscillator for supplying a digital signal which corresponds to the value of said phase deviation.

4. A circuit as claimed in claim 3, wherein said state detector is a threshold device for detecting the synchronised state when the content of the second counter is lower than the predetermined value of the threshold or the unsynchronised state when the said content is at least equal to said value.

5. A circuit as claimed in claim 4, wherein said threshold device comprises a device for recording the successive digital signals from the output of the second counter and a change-over device of the correction signal generator in the state of maintaining synchronisation or in the state of searching synchronisation depending on the content of said recording and in that said correction signal generator comprises, in the state of maintaining synchronisation, a digital low-pass filter for eliminating disturbances and in the state of searching synchronisation, a digital divider for dividing the content of the second counter in order to obtain a value which is lower than the threshold of the state detector.

6. A circuit as claimed in claim 1, comprising a stabilising stage for the useful output signal of the frequency divider including an integrator of said signal, two comparators, arranged in parallel and each receiving the sawtooth-shaped output signal of the integrator, and a fourth gate receiving at two of its inputs the output signals of said comparators, respectively, and at a third input the output signal of an inverter of the output signal of the decoder.

7. A circuit as claimed in claim 6, wherein said integrator comprises a weak integration path for generating the sawtooth signal and a controllable, strong integration path for adjusting the average value of this sawtooth signal.

* * * * *

UNITED STATES PATENT AND TRADEMARK OFFICE
CERTIFICATE OF CORRECTION

PATENT NO. : 4,351,002
DATED : September 21, 1982
INVENTOR(S) : ALAIN DECRAEMER, JEAN-MICHEL PERNOT It is certified that error appears in the above—identified patent and that said Letters Patent is hereby corrected as shown below:

COL 10, Line 27   Delete --from--

Signed and Sealed this

Fourteenth Day of December 1982

[SEAL]

Attest:

Attesting Officer

GERALD J. MOSSINGHOFF
Commissioner of Patents and Trademarks